United States Patent [19]

Fukushima

[11] Patent Number: 4,979,602
[45] Date of Patent: Dec. 25, 1990

[54] RELEASE DEVICE FOR A CLUTCH

[75] Inventor: Hirotaka Fukushima, Neyagawa, Japan

[73] Assignee: Kabushiki Kaisha Daikin Seisakusho, Osaka, Japan

[21] Appl. No.: 430,385

[22] Filed: Nov. 2, 1989

[30] Foreign Application Priority Data

Nov. 9, 1988 [JP] Japan .......................... 63-146207[U]

[51] Int. Cl.[5] ............................................ F16D 25/06
[52] U.S. Cl. ............................... 192/85 CA; 192/91 A
[58] Field of Search ......................... 192/85 CA, 91 A

[56] References Cited

U.S. PATENT DOCUMENTS

| | | | |
|---|---|---|---|
| 2,422,155 | 6/1947 | Wemp | 192/85 CA |
| 2,717,680 | 9/1955 | Smith | 192/91 A |
| 3,687,253 | 8/1972 | Bjorklund | 192/91 A |
| 4,456,111 | 6/1984 | Limbacher | 192/85 CA |
| 4,518,070 | 5/1985 | Ooka | 192/96 |
| 4,561,531 | 12/1985 | Young et al. | 192/85 CA |
| 4,585,106 | 4/1986 | Shirley | 192/91 A |
| 4,601,374 | 7/1986 | Ladin | 192/85 CA |
| 4,620,625 | 11/1986 | Ladin | 192/85 CA |
| 4,650,055 | 3/1987 | Ooka | 192/96 |

Primary Examiner—Rodney H. Bonck
Assistant Examiner—Nicholas Whitelaw
Attorney, Agent, or Firm—Armstrong, Nikaido, Marmelstein, Kubovcik & Murray

[57] ABSTRACT

A release device for a clutch comprising a cylinder disposed within a clutch housing and having a cylindrical intermediate wall portion projecting toward a release bearing, a piston having a cylindrical hollow portion and connected to the release bearing, the intermediate wall portion being slidably fitted in the hollow portion through a main seal, an operation chamber defined by a part of the hollow portion, the operation chamber facing the front end of the intermediate wall portion, an external hydraulic mechanism connected to the operation chamber, the cylinder further having an inner wall portion and an outer wall portion, both of a cylindrical shape, which fit in the piston, an auxiliary seal provided between each of the wall portions and the piston, and a drain oil passage formed in the cylinder which connects internal spaces between the inner and intermediate wall portions of the cylinder and between the outer and intermediate wall portions of the cylinder to a discharge site outside the clutch housing.

1 Claim, 1 Drawing Sheet

RELEASE DEVICE FOR A CLUTCH

BACKGROUND OF THE INVENTION

(1) Field of the Invention

This invention relates to a device for a friction clutch for use in automobiles or the like, of the type in which a release bearing for controlling engage/release operation of the clutch is hydraulically operated.

(2) Description of the Prior Art

Hitherto, as described in, for example, Japanese Patent Laid-Open Publication No. 59-1820 (corresponding U.S. patent application Ser. No. 370,710 filed on 4/22/1982, now U.S. Pat. No. 4,620,625 and, U.S. patent application Ser. No. 459,184, filed on 1/19/1983, now U.S. Pat. No. 4,601,374) some type of friction clutch incorporates such an arrangement that a cylinder device for driving a release bearing is disposed adjacent the release bearing in a clutch housing.

According to such arrangement, the cylinder is formed with a cylindrical operation chamber (a hollow) and a cylindrical piston fits in the operation chamber. The piston projects outwardly from one end of the operation chamber, the projecting end of the piston being connected to the release bearing.

According to the above arrangement, a seal is provided to seal off the operation chamber, but it is inevitable that operation fluid leaks outward, though in very small amount, from a circumferential surface of the seal. Such leak fluid is likely to scatter about within the clutch housing, so that it deposits on friction facing and other parts. As a result, undesirable slippage may be caused to the friction facing. Another trouble is that any fluid affected part is easily liable to corrosion.

The object of the invention is to provide a release device for a clutch which eliminates the foregoing problems.

SUMMARY OF THE INVENTION

In order to accomplish the above objects, according to the invention there is provided a release device for a clutch comprising a cylinder disposed within a clutch housing in axial alignment relation with a release bearing, said cylinder having a cylindrical intermediate wall portion projecting toward the release bearing, a cylindrical piston having a cylindrical hollow portion open at one end which is connected to the release bearing, said intermediate wall portion being slidably fitted through a main seal into said hollow portion, a part of said hollow portion defining an operation chamber facing a front end of said intermediate wall portion, a hydraulic control mechanism connected to the exterior of the operation chamber, said cylinder further having an inner wall portion and an outer wall portion, both of a cylindrical shape, which is fitted respectively on inner and outer peripheries of the piston, auxiliary seals provided between said inner wall portion and said piston and between said outer wall portion and said piston, and a drain oil passage provided in said cylinder for connecting internal spaces between said inner and intermediate wall portions and between said outer and intermediate wall portions to a discharge site outside the clutch housing.

According to the above arrangement, any leakage fluid from the operation chamber flows between the intermediate wall portion of the cylinder and the outer and inner walls of the piston until the fluid reaches the internal spaces of the cylinder, from which it in turn flows into the drain passage for being discharged to a suitable discharge site.

Generally, in a space external of the release device are present in suspension foreign matters, such as worn metal particles, which may deposit on an exposed surface of the release device. If such foreign matter should reach the main seal, the main seal will be damaged.

According to the arrangement as outlined above, however, before any foreign matter from an external source can reach the main seal, it must clear the circumference of the auxiliary seal and move into an internal space of the cylinder along the inner side of the outer wall portion of, or the outer side of the inner wall portion of the cylinder, and travel a further distance along the outer or inner periphery of the intermediate wall portion of the cylinder, without entering the drain passage. As a matter of practice, therefore, no foreign matter could reach the main seal passing through the auxiliary seal and such a bent long passage.

BRIEF DESCRIPTION OF THE DRAWING

In the drawing, the single FIGURE is a schematic sectional view of one embodiment of the invention.

DESCRIPTION OF THE PREFERRED EMBODIMENTS

Figure 1:
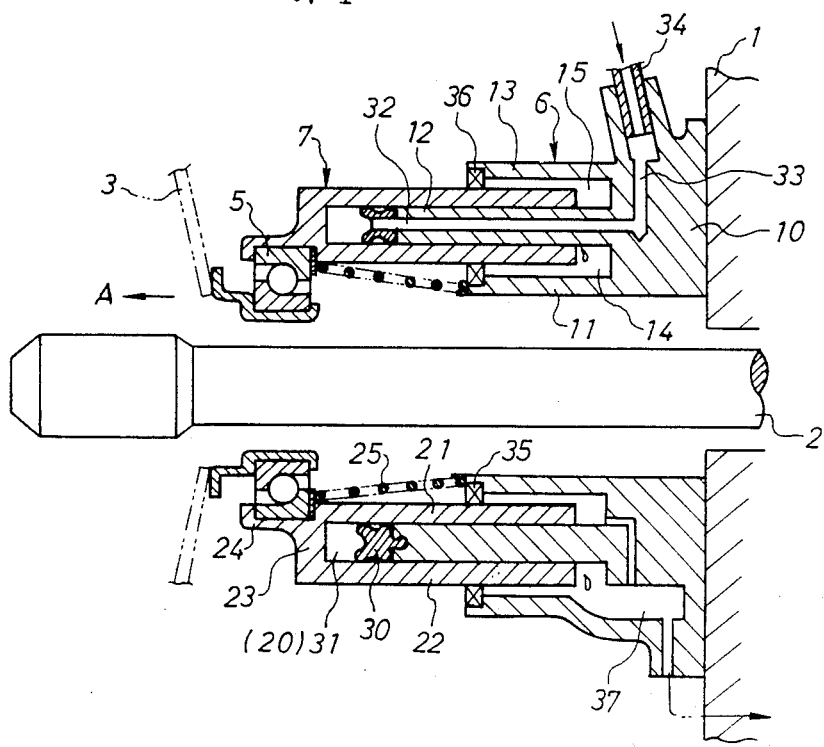

In the single FIGURE, a transmission input shaft 2 projects from a transmission housing 1 into a clutch housing not shown. A release device for a clutch is mounted on an external surface of the housing 1 to surround the input shaft 2. A clutch disk not shown is connected to a front end of the input shaft 2 so that the clutch is connected by pressing a friction facing of the clutch disk by a pressure plate against a flywheel. An annular diaphragm spring 3 is connected to the pressure plate for controlling pressing operation of the flywheel (that is, engage/release operation of the clutch).

A release bearing 5 of the release device is connected to the inner periphery of the diaphragm spring 3. The clutch is released by moving the release bearing 5 in the direction of arrow A and is engaged by moving the release bearing 5 in the opposite direction (that is, releasing a force acting in the direction of arrow A). The above arrangement is well known in the art.

The release device is equipped, in addition to the release bearing 5, with a cylinder 6 and piston 7. The cylinder 6 is located intermediate between the housing 1 and the release bearing 5 and has, in integral relation therewith, an annular portion 10 extending round the input shaft 2, and an inner wall portion 11, an intermediate wall portion 12, and an outer wall portion 13, which wall portions are of a cylindrical shape and located in concentric relation to the input shaft 2. The annular portion 10 is fixed to the outer surface of the housing 1 by certain means not shown. The wall portions 11, 12, 13 extend respectively from inner wall, radially median, and outer wall portions of the annular portion 10 in a direction away from the housing 1, and between the wall portions are defined spaces 14, 15 having an annular sectional shape which are open toward the release bearing 5.

The piston 7 is generally cylindrical and has an hollow portion 20 open toward the housing 1 and extending concentrically with the input shaft 2. In other words, the piston 7 has, in integral relation therewith, cylindrical inner and outer wall portions 21, 22, and an end wall portion 23 which continues to the release bearing 5 side ends of the wall portions 21, 22. Further, in the arrangement shown, the piston 7 has a cylindrical wall portion 24 projecting from the end wall portion 23 toward the diaphragm spring 3. An outer race of the release bearing 5 is fixed to the inner periphery of the wall portion 24. At a location adjacent the release bearing 5, a return spring 25 (a compression coil spring) is interposed between a snap ring fixed to the inner periphery of the end wall portion 23 and the front end of the inner wall portion 11.

The intermediate wall portion 12 of the cylinder 6 slidably fits in the hollow portion 20 of the piston 7, and the inner and outer wall portions 21, 22 of the piston 7 slidably fit in the spaces 14, 15 of the cylinder 6 respectively.

An annular main seal 30 is fixed to the front end of the intermediate wall portion 12, and an operation chamber 31 is defined by the hollow portion 20 between the main seal 30 and the end wall portion 23. The main seal 30 seals the operation chamber 31 relative to a clearance (sliding surface) between the intermediate wall portion 12 and the inner wall portion 21 and to a clearance (sliding surface) between the intermediate wall portion 12 and the outer wall portion 22.

In the main seal 30 and at one location (or a plurality of circumferentially spaced locations) in the intermediate wall portion 12 there are provided a series of control oil passages 32 extending in the axial direction (or in a direction parallel to the input shaft 2). The control oil passages 32 connect at one end to the operation chamber 31 and at the other end to one end of a generally axially extending oil passage 33 in the annular portion 10. The other end of the oil passage 33 is open at an outer peripheral site of the annular portion 10 and is connected through an external oil passage 34 to a hydraulic control mechanism (not shown) outside the clutch housing. The hydraulic control mechanism controls hydraulic pressure in response to the operation of a clutch pedal.

Of course, when high pressure is supplied into the operation chamber by the hydraulic control mechanism, the piston 7 moves in the direction of arrow A to shift the release bearing 5 in that direction, so that the clutch is released as above stated. When the hydraulic pressure of the operation chamber 31 is released, force applied by the release bearing on the diaphragm spring 3 is released, whereby the clutch is engaged.

According to the arrangement of the invention, there are further provided auxiliary seals 35, 36 at respective front ends of the inner wall portion 11 and outer wall portion 13. The auxiliary seals 35, 36 are respectively fixed to notches cut in the front end outer periphery of the inner wall portion 11 and the front end inner periphery of the outer wall portion 13 and are slidably fitted on the inner periphery of the inner wall portion 21 and on the outer periphery of the outer wall portion 22.

The inner and outer wall portions 21, 22 extend only midway into above mentioned spaces 14, 15 respectively, so that bottom portions of the spaces 14, 15 (between front ends of the wall portions 21, 22 and the annular portion 10) define comparatively spacious hollows. A drain oil passage 37 is connected at one end to the bottom portions of the spaces 14, 15. The drain oil passage 37 is formed in a lower portion of the annular portion 10 and is connected at the other end through a separate passage (not shown) to a suitable discharge site outside the clutch housing.

According to the above described arrangement, operation fluid within the operation chamber 31 oozes out, though in very small amounts, to the inner and outer peripheral surfaces of the intermediate wall portion 12 passing across the circumferential surface of the main seal 30, so that the sliding surfaces between the intermediate wall portion 12 and the inner wall portion 21 and between the intermediate wall portion 12 and the outer wall portion 22 are lubricated. Such oozing fluid flows from the sliding surfaces into the spaces 14, 15 and is finally discharged through the drain oil passage to an external discharge site. Therefore, the oozing fluid will never leak into the space surrounding the release device (space within the clutch housing).

If a very slight amount of operation fluid flows from the spaces 14, 15 to sites adjacent the auxiliary seals 35, 36 passing along the outer side of the inner wall portion 11 or the inner side of the outer wall portion 13, leakage of such oozing fluid outward of the release device can be positively prevented by means of the auxiliary seals 35, 36.

Generally, foreign matters such as worn metallic particles are present in suspension in a space external of the release device, and such foreign matter may deposit on the outer surface of the release device. If such foreign matter should reach the seal 30, the seal 30 would be damaged.

However, entry of such foreign matter into the interior of the cylinder 6 is prevented by the auxiliary seals 35, 36. Even if the foreign matter clears the auxiliary seal 36, for example, it must, before it can reach the main seal 30, enter the hollow portion of the space 15 passing through the clearance between the outer wall portion 13 and the outer wall portion 22, and travel a further distance from the space 15 along the sliding surfaces of the intermediate wall portion 12 and of the outer wall portion 22 without entering the drain oil passage 37. Actually, no foreign matter could reach the main seal 30 via such bent long passage.

According to the invention, as described above, oozing fluid from the operation chamber 31 can be discharged into the drain oil passage 37. Therefore, oozing fluid can be effectively prevented from depositing on any part of the clutch and possible slippage of the friction facing and corrosion of parts can be prevented.

Since foreign matter can be prevented from reaching the main seal 30, serviceability of the main seal 30 can be greatly enhanced.

What is claimed is:

1. A release device for a clutch comprising a cylinder disposed within a clutch housing in axial alignment relation with a release bearing, said cylinder having a cylindrical intermediate wall portion projecting toward the release bearing, a cylindrical piston having a cylindrical hollow portion open at one of its ends and connected at its other end to the release bearing, said intermediate wall portion being slidably fitted through a main seal into said hollow portion, a part of said hollow portion defining an operation chamber facing a front end of said intermediate wall portion, a hydraulic control mechanism connected to the exterior of the operating chamber, said cylinder further having a radial inner wall portion and a radial outer wall portion, both of cylindrical shape, which are fitted respectively on radial inner and radial outer peripheral walls of said cylindrical piston, auxiliary seals between said inner wall portion and said piston and between said outer wall portion and said piston, and a drain oil passage provided in said cylinder for connecting internal spaces between said inner and intermediate wall portions and between said outer and intermediate wall portions to a discharge site.

* * * * *